United States Patent [19]
Wrede

[11] Patent Number: 5,184,875
[45] Date of Patent: Feb. 9, 1993

[54] METHOD FOR OPERATING THE BRAKE SYSTEM OF A COMMERCIAL VEHICLE

[75] Inventor: Juergen Wrede, Stuttgart, Fed. Rep. of Germany

[73] Assignee: Robert Bosch GmbH, Stuttgart, Fed. Rep. of Germany

[21] Appl. No.: 694,614

[22] Filed: May 2, 1991

[30] Foreign Application Priority Data

Jul. 28, 1990 [DE] Fed. Rep. of Germany ....... 4024078

[51] Int. Cl.⁵ ............ B60T 10/00; B60T 17/18; H02P 15/00; G01L 5/28
[52] U.S. Cl. .......................................... 303/3; 303/7; 303/20
[58] Field of Search ............ 303/105, 104, 7, 8, 303/9, 20, 15-17, 3; 188/296

[56] References Cited

U.S. PATENT DOCUMENTS

| | | | |
|---|---|---|---|
| 3,774,975 | 11/1973 | Schmidt | 303/7 |
| 3,823,986 | 7/1974 | Pollinger et al. | 188/296 X |
| 4,095,680 | 6/1978 | Vogelsang | 303/3 X |
| 4,418,963 | 12/1983 | Sprockhoff | 303/3 |
| 4,659,149 | 4/1987 | Rumsey et al. | 303/3 |
| 4,744,607 | 5/1988 | Nagata | 303/16 |
| 4,768,840 | 9/1988 | Sullivan et al. | 303/7 X |
| 4,818,035 | 4/1989 | McNinch, Jr. | 303/7 |
| 4,971,179 | 11/1990 | Gebhardt et al. | 303/20 X |
| 4,986,610 | 1/1991 | Beck et al. | 303/20 X |

FOREIGN PATENT DOCUMENTS

| | | |
|---|---|---|
| 0189082 | 7/1986 | European Pat. Off. . |
| 288866 | 11/1988 | European Pat. Off. . |
| 386952 | 9/1990 | European Pat. Off. . |
| 0119613 | 9/1979 | Japan ..... 303/20 |
| 2080458 | 6/1981 | United Kingdom . |

Primary Examiner—Matthew C. Graham
Assistant Examiner—Josie A. Ballard
Attorney, Agent, or Firm—Edwin E. Greigg; Ronald E. Greigg

[57] ABSTRACT

A method operating a braking system to prevent or overcome glazing of the brake linings. The brake system has a friction-affected service brake and a wear-free auxiliary brake. A brake value, for instance vehicle deceleration, can be specified to the brakes by a brake value transducer. On the specification of the brake value transducer signals, a control unit triggers the brakes; it detects and evaluates signals characterizing the braking action. Upon a request for braking, the control unit preferentially triggers the auxiliary brake. If the brake value transducer signal level is high, it additionally switches on the service brake. The control unit detects the number of braking events of the service brake and their intensity (duration, action, etc.). As a function of these data, the control unit detects a threatening danger of glazing or glazing that has already begun and triggers the service brake exclusively. The brake linings of the service brake undergo 'deglazing' by braking, by way of an adequate temperature rise.

8 Claims, 1 Drawing Sheet

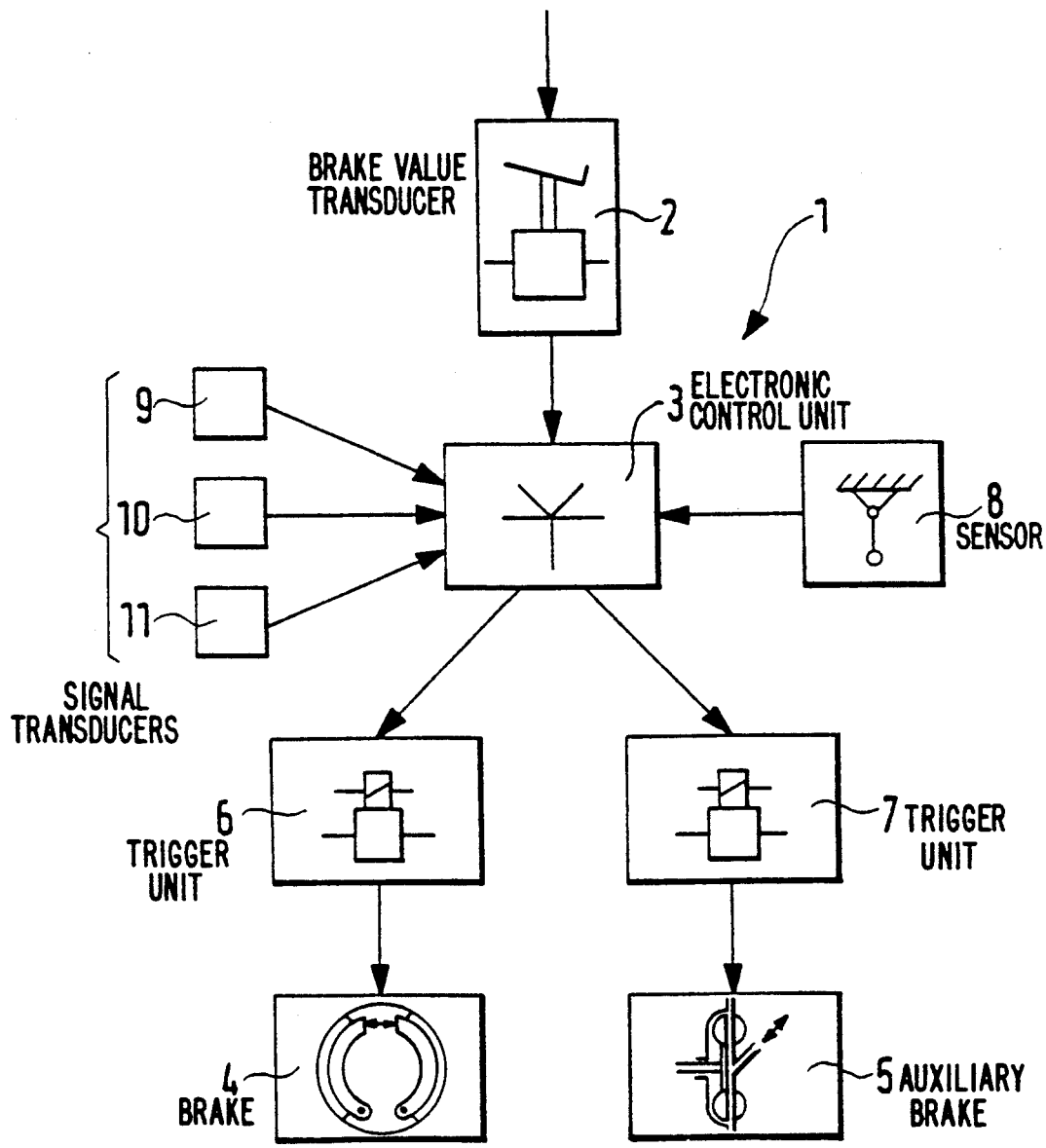

METHOD FOR OPERATING THE BRAKE SYSTEM OF A COMMERCIAL VEHICLE

BACKGROUND OF THE INVENTION

The invention is based on a method as defined hereinafter.

Such a method is known from European Patent Application 0 189 082. This method is used to make for a uniform brake action at the friction-affected brakes of a vehicle that is also equipped with a wear-free retarder, and to protect the brakes from overload. To this end, temperature signals from the wheel brakes that characterize the brake action are detected and evaluated in a control unit. If there is an overload on the friction-affected brakes, which is exhibited by excessive temperatures of the brake linings, the control unit reduces the brake value transducer signal at the applicable brake or brakes. However, a vehicle is endangered not only by a brake overload, but also if a brake's action is inadequate. This can happen if overly slightly brake outputs cause the brake linings not to reach the temperature above which so-called glazing is prevented.

This change in the brake lining surface, which lowers the coefficient of friction $\mu$, occurs to an increased extent in asbestos-free brake linings, which are increasingly used in vehicle brakes. If a vehicle is equipped with a wear-free auxiliary brake, then for reasons of economy the result will be a reduced load on the friction-affected service brake, which runs the risk of glazing of the brake linings. In a vehicle with glazed brake linings, only reduced braking action is available in an emergency braking situation.

OBJECT AND SUMMARY OF THE INVENTION

The method according to the invention has an advantage over the prior art in that the performance capacity of the service brake is maintained by avoiding glazing of the brake linings, or is reestablished by "deglazing" by braking, but at the same time the brake system remains economical, since brake lining wear is reduced by preferential triggering of the wear-free auxiliary brake.

The provisions disclosed herein has an advantage that in this kind of braking ("warm braking"), the brake lining temperature attains a level at which carbon, which has a higher coefficient of friction, or a coefficient of friction for which the brakes have been designed, builds up on the brake linings as a result of friction.

With the provisions recited herein, however, overheating and burning of the brake linings are prevented.

Recited herein are additional parameters by which a control unit can trip preferential triggering of the service brake.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing is a block diagram of a brake system of a commercial vehicle intended for carrying out the method of the invention.

DESCRIPTION OF THE PREFERRED EMBODIMENT

The schematically shown electrically controlled brake system 1 shown in the drawing for a commercial vehicle has a brake value transducer 2, with which a brake value can be specified and which is actuatable by the vehicle driver. This brake value may be a setpoint value for vehicle deceleration. The brake value is transmitted to a electronic control unit 3 of the brake system 1 and evaluated in accordance with a control algorithm stored in the control unit. On the specification of the brake value transducer signal, the control unit 3 selects one or more brakes of the vehicle, in order to attain the desired deceleration. The vehicle has a friction-affected service brake 4, which has drum brakes and/or disk brakes. The vehicle is also equipped with a wear-free auxiliary brake 5. This may be a fluid brake (hydrodynamic retarder), an eddy current brake (electrodynamic retarder), or a motor brake. Whichever type of brake it is, it is preceded by a trigger unit 6, 7, with which the required actuating medium (compressed air, electrical energy, hydraulic oil) can be controlled. The brake system 1 also has a sensor 8 for detecting the braking action, for instance the actual deceleration value. The signal characterizing the braking action is carried to the control unit 3 and evaluated by it. Finally, a plurality of signal transducers 9, 10, 11 are provided, with which for instance the number of braking events performed by the service brake 4, their duration the brake pressure in the case of hydraulic or pneumatic drum or disk brakes, the distance traveled since the last actuation of the service brake, and the vehicle speed at the onset of actuation of the service brake are detected, and signals are sent accordingly to the control unit 3.

Upon a braking event tripped by the vehicle driver, the control unit 3 preferentially triggers the wear-free auxiliary brake 5. Depending on the level of the signal output by the brake value transducer 2, that is, at a high set-point deceleration value, the control unit 3 additionally triggers the friction-affected service brake 4 to attain the desired braking action. Based on the signals of the deceleration sensor 8 and the other signal transducers 9, 10, 11, the braking events performed with the service brake 4 are counted in the control unit, and their duration and action and so forth are detected, in order to ascertain the intensity of service brake actuation. If the control unit recognizes from these data that glazing of the service brake linings threatens to occur or has already begun, then upon an ensuing brake request or in a plurality of subsequent brake requests with a high brake value transducer signal level, it triggers braking with the service brake 4 exclusively, in order to eliminate the danger of glazing or the glazing itself by means of adequate "warm braking", that is, braking with an adequate rise in the brake lining temperature. The point for tripping this kind of braking can be ascertained by trial and error and can be made the basis of the control algorithm in the control unit 3. However, if in such braking the control unit 3 recognizes the danger of overheating of the brake linings of the service brake 4, then it triggers the auxiliary brake 5 additionally or exclusively.

The mode of operation of the brake system described above can be used preferentially for on-road vehicles such as tractors, trailers, or tractor-trailer combinations.

The foregoing relates to a preferred exemplary embodiment of the invention, it being understood that other variants and embodiments thereof are possible within the spirit and scope of the invention the latter being defined by the appended claims.

What is claimed and desired to be secured by Letters Patent of the United States is:

1. A method for operating a brake system (1) of a commercial vehicle having a friction-affected service brake (4) and a wear-free auxiliary brake (5), which comprises actuating a brake value transducer (2) by a driver to produce a brake output value signal for deceleration of the vehicle; directing said brake output value signal to an electronic control unit (3), directing different brake value signals from different signal transducers (9-11) and directing signals from a deceleration sensor (8) to said control unit (3), operating said control unit (3) which receives the brake output value signal from said brake value transducer, said brake value signals from the different signal transducers and said deceleration sensor to produce a control signal; directing the control signal from said control unit to a first trigger unit (7) to trigger the wear-free auxiliary brake (5); detecting and evaluating the braking action of said wear-free auxiliary brake and upon a request for further braking, controlling the control unit (3) to trigger a second trigger unit (6) thereby switching on the service brake (4); detecting the number, intensity, and duration of braking events by the service brake (4); deactivating the wear-free auxiliary brake and subsequently as a function of the number of braking events, their intensity and duration, to trigger the service brake (4) exclusively to avoid glazing.

2. A method as defined by claim 1, which comprises controlling the control unit (3) to trigger the service brake (4) only when a brake value transducer signal level is at a high set point deceleration value.

3. A method as defined by claim 2, which comprises controlling the control unit (3) to trigger the auxiliary brake (5) additionally during exclusive operation of the service brake (4) if an overload of the service brake (4) threatens.

4. A method as defined by claim 2, which comprises controlling the control unit (3) to trigger the auxiliary brake (5) exclusively if an overload of the service brake (4) threatens.

5. A method as defined by claim 1, which comprises controlling the control unit (3) to trigger the auxiliary brake (5) additionally during exclusive operation of the service brake (4) if an overload of the service brake (4) threatens.

6. A method as defined by claim 1, which comprises controlling the control unit (3) to detect and evaluate the brake value transducer signal a distance traveled since the last service brake triggering, and a vehicle speed at the onset of braking for exclusive operation of the service brake (4).

7. A method as defined by claim 1, which comprises controlling the control unit (3) to trigger the auxiliary brake (5) exclusively if an overload of the service brake (4) threatens.

8. A method as defined by claim 1, which comprises controlling the control unit (3) to detect and evaluate a brake pressure acting upon the service brake (4), a distance traveled since the last service brake triggering, and a vehicle speed at the onset of braking for exclusive operation of the service brake (4).

* * * * *